(12) United States Patent
Heigl et al.

(10) Patent No.: US 7,816,878 B2
(45) Date of Patent: Oct. 19, 2010

(54) VEHICLE ACCESS CONTROL SYSTEM

(75) Inventors: Keith D. Heigl, Winamac, IN (US);
Ronald W. Goodrich, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 285 days.

(21) Appl. No.: 12/024,440

(22) Filed: Feb. 1, 2008

(65) Prior Publication Data
US 2008/0184623 A1    Aug. 7, 2008

Related U.S. Application Data

(60) Provisional application No. 60/887,685, filed on Feb. 1, 2007.

(51) Int. Cl.
*G05D 3/00* (2006.01)
(52) U.S. Cl. .................. 318/466; 318/266; 318/468; 318/445; 414/454
(58) Field of Classification Search .................. 318/266, 318/282, 286, 445, 446, 462, 466, 468, 280, 318/283, 430, 464, 46; 414/462, 540, 455, 414/454; 701/49; 49/506, 31
See application file for complete search history.

(56) References Cited

U.S. PATENT DOCUMENTS

| 3,651,965 A | 3/1972 | Simonelli et al. |
| 3,874,527 A | 4/1975 | Royce |
| 4,164,292 A | 8/1979 | Karkau |
| 4,176,999 A | 12/1979 | Thorley |
| 4,251,179 A | 2/1981 | Thorley |
| 4,325,668 A | 4/1982 | Julian et al. |
| 4,339,224 A | 7/1982 | Lamb |
| 4,576,539 A | 3/1986 | Williams |
| 5,140,316 A * | 8/1992 | DeLand et al. ......... 340/825.69 |
| 5,180,275 A | 1/1993 | Czech et al. |
| 5,261,779 A | 11/1993 | Goodrich |
| 5,293,632 A | 3/1994 | Novakovich et al. |
| 5,299,904 A | 4/1994 | Simon et al. |

(Continued)

OTHER PUBLICATIONS

"The 1999 Ford Windstar", VMI Voice Technical Edition, Publication, Apr. 1999.

(Continued)

*Primary Examiner*—Paul Ip
(74) *Attorney, Agent, or Firm*—Michael Best & Friedrich LLP

(57) ABSTRACT

A system and method for coordinating movement of a powered sliding door module and an access ramp for a vehicle. A system control board communicates with a current detector that can detect current on the power wires for the sliding door's motor. The current detector signals the system control board when it detects current and the system control board determines whether the ramp is stowed or deployed. If the ramp is deployed, the system control board stops and reverses the door so that the door remains open. The system control board then stows the ramp and closes the door. If the ramp is stowed, the system control board waits for the current in the door motor to return to zero and then determines if the door is completely open. If the door is not completely open the system control board does nothing. If the door is completely open, the system control board deploys the ramp.

24 Claims, 7 Drawing Sheets

U.S. PATENT DOCUMENTS

| | | | |
|---|---|---|---|
| 5,305,355 | A | 4/1994 | Go et al. |
| 5,308,214 | A | 5/1994 | Crain et al. |
| 5,350,986 | A | 9/1994 | Long et al. |
| 5,380,144 | A * | 1/1995 | Smith et al. ............... 414/537 |
| 5,389,920 | A * | 2/1995 | DeLand et al. .......... 340/825.69 |
| 5,391,041 | A | 2/1995 | Stanbury et al. |
| 5,396,158 | A * | 3/1995 | Long et al. ................. 318/282 |
| 5,434,487 | A | 7/1995 | Long et al. |
| 5,697,048 | A | 12/1997 | Kimura |
| 5,737,335 | A | 4/1998 | Mizuta et al. |
| 5,769,480 | A | 6/1998 | Gebhardt |
| 5,825,098 | A | 10/1998 | Darby et al. |
| 5,835,873 | A | 11/1998 | Darby et al. |
| 5,979,114 | A | 11/1999 | Clark et al. |
| 6,028,537 | A | 2/2000 | Suman et al. |
| 6,042,327 | A | 3/2000 | Deleo et al. |
| 6,053,693 | A | 4/2000 | Ringdahl et al. |
| 6,064,165 | A | 5/2000 | Boisvert et al. |
| 6,075,460 | A * | 6/2000 | Minissale et al. ....... 340/825.69 |
| 6,077,025 | A | 6/2000 | Budd et al. |
| 6,179,545 | B1 * | 1/2001 | Petersen et al. ............. 414/537 |
| 6,238,168 | B1 | 5/2001 | Cohn et al. |
| 6,238,169 | B1 | 5/2001 | Dupuy et al. |
| 6,275,167 | B1 | 8/2001 | Dombrowski et al. |
| 6,300,879 | B1 | 10/2001 | Regan et al. |
| 6,302,439 | B1 | 10/2001 | McCurdy |
| 6,357,992 | B1 | 3/2002 | Ringdahl et al. |
| 6,409,458 | B1 | 6/2002 | Cohn et al. |
| 6,515,377 | B1 | 2/2003 | Ubelein et al. |
| 6,594,565 | B1 * | 7/2003 | Schafer et al. ................ 701/36 |
| 6,825,628 | B2 * | 11/2004 | Heigl et al. ................. 318/468 |
| 7,186,205 | B2 | 3/2007 | Lahr et al. |
| 7,274,980 | B1 | 9/2007 | Schafer et al. |
| 7,417,395 | B2 * | 8/2008 | Edwards et al. ............. 318/445 |
| 7,453,224 | B2 | 11/2008 | Sullivan |
| 7,551,995 | B2 * | 6/2009 | Heigl et al. ................... 701/36 |
| 7,684,915 | B1 | 3/2010 | Dailey et al. |
| 2003/0007851 | A1 * | 1/2003 | Heigl et al. ................. 414/454 |
| 2003/0007853 | A1 | 1/2003 | Cohn et al. |
| 2003/0044266 | A1 * | 3/2003 | Vandillen et al. ............ 414/537 |
| 2005/0177288 | A1 | 8/2005 | Sullivan et al. |
| 2006/0104775 | A1 | 5/2006 | Kasten et al. |
| 2007/0086879 | A1 | 4/2007 | Goodrich et al. |
| 2007/0267992 | A1 * | 11/2007 | Edwards ..................... 318/445 |
| 2008/0044268 | A1 * | 2/2008 | Heigl et al. ................. 414/462 |
| 2009/0133334 | A1 * | 5/2009 | Edwards et al. .............. 49/360 |
| 2009/0240402 | A1 | 9/2009 | Lugash et al. |
| 2009/0259371 | A1 * | 10/2009 | Heigl et al. ................... 701/49 |
| 2009/0274542 | A1 * | 11/2009 | Pocobello et al. ........... 414/522 |

OTHER PUBLICATIONS

"Activan, Accessibility with Style. Conversion of General Motors Minivans", Service Manual, Dec. 9, 1999, Published by Ricon Corporation.
"Braun Entervan", Brochure, 2001, Published by the Braun Corporation.
"Entervan, The Braun Corporation", Series 03 and later Fully-Automatic 1996 and newer Chrysler Entervan II, Owner's/ Service Manual, Revision Aug. 1998, 5230096-03.
Holicky, Richard, "Big Vans, Minivans Pros and Cons", New Mobility Magazine, Jun. 1997.
"Honda Odyssey Minivan Conversion", Owner's Manual, Oct. 2006, Published by VMI.
"New Ramp & Electrical Systems on All Power Rampvans", Available online at: <www.ims-vans.com/RampElectrical.htm>, May 12, 1999.
"Odyssey 2005-2006 Electrical Troubleshooting", Manual, Mar. 2006, Published by American Honda Motor Co., Inc.

"Automotive: Serial Communication", Installation Guide Model MPC01 Multi-Purpose Controller, 1998, Published by Whelan Engineering Company Inc., Chester, CT.
"Automotive: Serial Communication", Installation Guide Model MPC01 Multi-Purpose Controller, 1995, Published by Whelan Engineering Company Inc., Chester, CT.
Sunderlin, Ann, "Van-Tastic, How'd They Do That", Nov. 1995, Paraplegia News Magazine.
"Wheels 2000 and Beyond", New Mobility Magazine, p. 48, publicly available prior to Jan. 1, 2002.
"VMI-4 Ford Windstar Factory Door Lockout Relay Pack", "Operation Characteristics of the VMI-4 Module", Technical Service Manual, Mar. 9, 2000.
"IMS Quality Team 1991-2001 Service Manual" Independent Mobility Systems, Inc. (Jan. 8, 1999).
"Honda Odyssey Minivan Conversion Owner's Manual" Vantage Mobility International (Oct. 2006).
"Ricon Activan Illustrated Index of Non-OEM Vehicle Equipment Including Electrical and Pneumatic Circuit Diagrams plus Diagnostic Flow Charts" Ricon Corporation, pp. 1-1 to 3-5 (May 10, 1999-Jun. 3, 1999).
"Ricon Activan General Motors Minivan Conversion Service Manual - 32DV0002.C" Ricon Corporation, pp. 1-1 to 6-13 (Jan. 3, 2000).
"Ricon Activan Service/Owner Manual - 35DACTOO.E" Ricon Corporation (Dec. 3, 1998).
Declaration of Steven Stadler (Jul. 28, 2006).
"Ricon Activan Conversion of General Motors Minivans Service Manual - 32DV0002.A" Ricon Corporation (Dec. 9, 1999).
"Ricon Activan Conversion of General Motors Minivans Service Manual - 32DV0002.B" Ricon Corporation (Dec. 9, 1999).
"Vantage Mini Vans Technical Service Manual" Vantage Mobility International (Jul. 10, 1997).
Vantage Mobility International Online Service Materials, Minivan Products Summit Northstar Kia HAV.
Vantage Mobility International Service Manual Excerpts for Systems Designed for 1993-2001 Model-Year Vehicles.
"IMS-Vans.com Whois Record" accessed from Domain Tools.
"Vantage Mini Vans Owners Manual" Vantage Mobility International.
"VMI Minivan Conversions Owner's Manual" Vantage Mobility International.
Various Power Sliding Door Electrical Diagrams for 1997-1999 Model-Year Vehicles, accessed from ALLDATA Online.
Waybackmachine www.ims-vans.com Website Excerpts from 1998-1999.
Waybackmachine www.braunlift.com Website Excerpts from 2000.
Correspondence, Pricing Lists and Invoices Relating to Ricon Activan (1999).
"EV Braun Entervan Brochure" The Braun Corporation (1999).
"Entervan Application Guide" The Braun Corporation (Jan. 1999).
"IMS Service Manual 1996-1998 Chrysler NS 1996-1998 Ford Windstar" Independent Mobility Systems, Inc. (Nov. 24, 1997).
"IMS 2004 Sienna Rampvan Service Manual" Independent Mobility Systems, Inc.
"IMS Service Manual 1994-1995 Chrysler" Independent Mobility Systems, Inc. (May 3, 1996).
"Plaintiff The Braun Corporation's Claim Terms at Issue and Proposed Definitions" *The Braun Corporation* v. *Vantage Mobility International, LLC et al.*, Civil Action No. 06-cv-050 RL, United States District Court for the Northern District of Indiana Hammond Division (Jun. 14, 2007).
"Plaintiff's Responses to Defendant American Honda Motor Co., Inc.'s First Set of Interrogatories (Nos. 1-12)" *The Braun Corporation* v. *Vantage Mobility International, LLC et al.*, Civil Action No. 06-cv-050 RL, United States District Court for the Northern District of Indiana Hammond Division (Dec. 18, 2006).
Draft Invalidity Claim Chart for IMS System: '628 Patent by David M. Auslander.
"Braun's Responses to VMI's Requests for Admissions" *The Braun Corporation* v. *Vantage Mobility International, LLC*, Civil Action No. 2:06-cv-050-JVB-PRC, United States District Court for the Northern District of Indiana Hammond Division (Apr. 5, 2010).

Draft Invalidity Claim Chart for Ricon System: '628 Patent by David M. Auslander.
Braun OEM Door Patent Review by Paul Edwards and Summary of Paul Edwards Interview Jun. 3, 2006.
"SAE J1850 Class B Data Communications Network Interface J1850 Topics" Bill Wiegand, GM Service Technology Group (Feb. 16, 2008).
"List of Terms to be Defined in the '628 Patent" *The Braun Corporation* v. *Vantage Mobility International, LLC*, Civil Action No. 2:06-cv-050-RL-PRC, United States District Court for the Northern District of Indiana Hammond Division (Jun. 14, 2007).
"VMI's Supplemental Answer to Interrogatory No. 9" *The Braun Corporation* v. *Vantage Mobility International, LLC et al.*, Civil Action No. 06-cv-050 RL, United States District Court for the Northern District of Indiana Hammond Division (May 27, 2009).
"Parties' Responses to Proposed Order & Opinion- Transcript of Proceedings" *The Braun Corporation* v. *Vantage Mobility International, LLC*, Civil Action No. 2:06-cv-050-JVB, United States District Court for the Northern District of Indiana Hammond Division (Jul. 28, 2008).
"Vantage Mobility International, LLC's Answers to Interrogatories" *The Braun Corporation* v. *Vantage Mobility International, LLC et al.*, Civil Action No. 06-cv-050 RL, United States District Court for the Northern District of Indiana Hammond Division (Mar. 12, 2007).
"Initial Disclosure Statement" *The Braun Corporation* v. *Vantage Mobility International, LLC*, Civil Action No. 2:06-cv-050-RL, United States District Court for the Northern District of Indiana Hammond Division (Sep. 12, 2006).
"Vantage Mobility International, LLC's Answers to Braun's Third Set of Interrogatories" *The Braun Corporation* v. *Vantage Mobility International, LLC et al.*, Civil Action No. 06-cv-050 RL, United States District Court for the Northern District of Indiana Hammond Division (May 14, 2007).
Ricon Updated Remote Control Specification (Mar. 20, 1998).
Vantage Mobility International, LLC's Answers to Braun's First Set of Interrogatories, *The Braun Corporation* v. *Vantage Mobility International, LLC et al.*, Civil Action No. 06-cv-050 RL, United States District Court for the Northern District of Indiana Hammond Division (Dec. 18, 2006).
"Supplemental Answers to Interrogatories" *The Braun Corporation* v. *Vantage Mobility International, LLC et al.*, Civil Action No. 06-cv-050 RL, United States District Court for the Northern District of Indiana Hammond Division (May 15, 2009).
"Amended Complaint for Patent Infringement" *The Braun Corporation* v. *Vantage Mobility International, LLC et al.*, Civil Action No. 06-cv-050 RL, United States District Court for the Northern District of Indiana Hammond Division (Jun. 15, 2006).
"Vantage Mobility International's Third Supplemental Responses to Requests for Production" *The Braun Corporation* v. *Vantage Mobility International, LLC et al.*, Civil Action No. 06-cv-050 RL, United States District Court for the Northern District of Indiana Hammond Division (Mar. 12, 2007).
"Defendant Vantage Mobility International, LLC's Answer to Plaintiff's Complaint and Counterclaim" *The Braun Corporation* v. *Vantage Mobility International, LLC*, Civil Action No. 2:06-cv-050-RL-PRC, United States District Court for the Northern District of Indiana Hammond Division (Aug. 9, 2006).
"Amended Answer of Defendant American Honda Motor Co., Inc." *The Braun Corporation* v. *Vantage Mobility International, LLC et al.*, Civil Action No. 06-cv-050 RL, United States District Court for the Northern District of Indiana Hammond Division (Aug. 22, 2006).
"Plaintiff's Reply to Defendant American Honda Motor Co.'s Counterclaim" *The Braun Corporation* v. *Vantage Mobility International, LLC et al.*, Civil Action No. 06-cv-050 RL, United States District Court for the Northern District of Indiana Hammond Division (Aug. 29, 2006).
"Plaintiff's Reply to Defendant Vantage Mobility International, LLC's Counterclaim" *The Braun Corporation* v. *Vantage Mobility International, LLC et al.*, Civil Action No. 06-cv-050 RL, United States District Court for the Northern District of Indiana Hammond Division (Aug. 29, 2006).
"Defendant Vantage Mobility International, LLC's Amended Answer to Plaintiff's Complaint and Counterclaim" *The Braun Corporation* v. *Vantage Mobility International, LLC*, Civil Action No. 2:06-cv-050-RL-PRC, United States District Court for the Northern District of Indiana Hammond Division (Apr. 19, 2007).
"Response to Motion to Dismiss or Strike Defendant Vantage Mobility International, LLC's Defense of Inequitable Conduct" *The Braun Corporation* v. *Vantage Mobility International, LLC*, Civil Action No. 2:06-cv-050-RL-PRC, United States District Court for the Northern District of Indiana Hammond Division (Jun. 11, 2007).
"Claim Construction Brief" *The Braun Corporation* v. *Vantage Mobility International, LLC*, Civil Action No. 2:06-cv-050-RL-PRC, United States District Court for the Northern District of Indiana Hammond Division (Jun. 28, 2007).
"Plaintiff's Response to Defendant's Claim Construction Brief" *The Braun Corporation* v. *Vantage Mobility International, LLC*, Civil Action No. 2:06-cv-050-RL-PRC, United States District Court for the Northern District of Indiana Hammond Division (Jul. 26, 2007).
"Declaration of Mathew G. Gavronski in Support of Plaintiff's Response to Defendant's Claim Construction Brief" *The Braun Corporation* v. *Vantage Mobility International, LLC*, Civil Action No. 2:06-cv-050-RL, United States District Court for the Northern District of Indiana Hammond Division (Jul. 26, 2007).
"Reply to Plaintiff's Claim Construction Brief and Request for Hearing" *The Braun Corporation* v. *Vantage Mobility International, LLC*, Civil Action No. 2:06-cv-050-RL-PRC, United States District Court for the Northern District of Indiana Hammond Division (Jul. 26, 2007).
"Plaintiff s Sur-Reply Brief on Claim Construction and Memorandum in Support of Motion to Strike the Declaration of David M. Auslander" *The Braun Corporation* v. *Vantage Mobility International, LLC*, Civil Action No. 2:06-cv-050-JVB-PRC, United States District Court for the Northern District of Indiana Hammond Division (Oct. 5, 2007).
"Sur-Reply to Plaintiff's Reply and Sur-Reply Brief on Claim Construction" *The Braun Corporation* v. *Vantage Mobility International, LLC*, Civil Action No. 2:06-cv-050-RL-PRC, United States District Court for the Northern District of Indiana Hammond Division (Oct. 29, 2007).
"Proposed Opinion and Order" *The Braun Corporation* v. *Vantage Mobility International, LLC*, Civil Action No. 2:06-cv-050 JVB, United States District Court for the Northern District of Indiana Hammond Division (Jul. 17, 2008).
"Defendant's Supplemental Claim Construction Brief" *The Braun Corporation* v. *Vantage Mobility International, LLC*, Civil Action No. 2:06-cv-050-JVB-PRC, United States District Court for the Northern District of Indiana Hammond Division (Sep. 22, 2008).
"Plaintiff s Reply to Defendant's Supplemental Claim Construction Brief" *The Braun Corporation* v. *Vantage Mobility International, LLC*, Civil Action No. 2:06-cv-050-JVB-PRC, United States District Court for the Northern District of Indiana Hammond Division (Oct. 23, 2008).
"Reply Brief in Support of Defendant's Supplemental Claim Construction Brief" *The Braun Corporation* v. *Vantage Mobility International, LLC*, Civil Action No. 2:06-cv-050-JVB, United States District Court for the Northern District of Indiana Hammond Division (Nov. 7, 2008).
"Opinion and Order" *The Braun Corporation* v. *Vantage Mobility International, LLC*, Civil Action No. 2:06-cv-050-JVB, United States District Court for the Northern District of Indiana Hammond Division (Mar. 26, 2009).
"Opinion and Order" *The Braun Corporation* v. *Vantage Mobility International, LLC*, Civil Action No. 2:06-cv-050-JVB-PRC, United States District Court for the Northern District of Indiana Hammond Division (Jan. 27, 2010).
"Defendant Vantage Mobility International, LLC's Second Amended Answer to Plaintiff's Complaint and Counterclaim" *The Braun Corporation* v. *Vantage Mobility International, LLC*, Civil Action No. 2:06-cv-050-JVB-PRC, United States District Court for the Northern District of Indiana Hammond Division (Feb. 1, 2010).
"Braun's Reply to VMI's Second Amended Counterclaim" *The Braun Corporation* v. *Vantage Mobility International, LLC*, Civil Action No. 2:06-cv-050-JVB-PRC, United States District Court for the Northern District of Indiana Hammond Division (Feb. 17, 2010).

"Defendant American Honda Motor Co., Inc's Responses to Plaintiff The Braun Corporation's First Set of Interrogatories" *The Braun Corporation* v. *Vantage Mobility International, LLC et al.*, Civil Action No. 06-cv-050 RL, United States District Court for the Northern District of Indiana Hammond Division (Dec. 18, 2006).

"Plaintiff's Claim Construction Memorandum" *The Braun Corporation* v. *Vantage Mobility International, LLC*, Civil Action No. 2:06-cv-050 RL, United States District Court for the Northern District of Indiana Hammond Division (Jun. 28, 2007).

"VMI's Response to Interrogatories" *The Braun Corporation* v. *Vantage Mobility International, LLC*, Civil Action No. 2:06-cv-050-JVB-PRC United States District Court for the Northern District of Indiana Hammond Division (Apr. 12, 2010).

"VMI's Response to Braun's Second Set of Requests for Production" *The Braun Corporation* v. *Vantage Mobility International, LLC*, Civil Action No. 2:06-cv-050-JVB-PRC United States District Court for the Northern District of Indiana Hammond Division (Apr. 12, 2010).

Declaration of Sean Whitmarsh (Apr. 9, 2010).

"Plaintiff's Responses to Vantage Mobility International, LLC's First Set of Interrogatories" *The Braun Corporation* v. *Vantage Mobility International, LLC*, Civil Action No. 2:06-cv-050-RL-PRC United States District Court for the Northern District of Indiana Hammond Division (Mar. 8, 2007).

* cited by examiner

VEHICLE ACCESS CONTROL SYSTEM

CROSS REFERENCE TO RELATED APPLICATIONS

This application claims the benefit of U.S. Provisional Application No. 60/887,685, filed Feb. 1, 2007, the entire contents of which are hereby incorporated by reference.

BACKGROUND

The present invention relates to vehicle access systems.

Access systems, such as motorized lifts, have been used to transport people and cargo between different elevations, such as between ground level and the elevated entryway of a door. These access systems include platforms, ramps, moving seats, movable steps, and the like, which may be attached to stationary structures, such as buildings and loading docks, or mobile structures such as vehicles. Access systems have been used to provide disabled and mobility-impaired individuals access to structures that traditionally were accessible only via steps or stairs, or that required an individual to step over or across an obstacle. For example, motorized lifts and ramps have been used to allow disabled and mobility-impaired individuals to enter and exit vehicles.

Currently, many automotive manufacturers offer minivans that include a power sliding door system to automatically open or close one or both of the vehicle's sliding doors. Components such as these which are installed by the manufacturer of the vehicle are commonly referred to as OEM (Original Equipment Manufacturer) components. While the specific configurations of OEM power sliding door systems vary depending on the manufacturer, many of the systems include at least a body control module, a door control module, a receiver, a door switch, and a data bus. In some systems, the body control module, door control module, receiver and door switch are all in communication with the vehicle's data bus, which enables the body control module, door control module, receiver and door switch to communicate with each other and to receive signals from a user indicating that the user wants to open or close the door (a "door operation signal"). Generally, the user may communicate a door operation signal to the power sliding door system by pulling on a door handle of the vehicle, operating buttons positioned within the vehicle, or by pushing a button on a keyless entry device or key fob. In many cases, if the door operation signal is produced by a remote device, such as the key fob, the receiver detects a signal sent from the key fob and communicates detection of that signal to the door control module which in turn operates the power sliding door system to open or close the door. If a user pulls on the door handle to initiate powered opening or closing of the door, a door switch in the door handle may close to send a door operation signal to one or both of the body control module or the door control module.

Before manufacturers provided OEM power sliding door systems, vehicle access system providers generally installed their own door control systems, including a door motor, door sensors, and the like. Such providers would also install a powered ramp or lift device including a ramp motor and a ramp control system. Now that manufacturers are providing OEM powered door control systems, the aftermarket access system providers must coordinate operation of their ramp control systems with the operation of the OEM door control systems. Some examples of how aftermarket ramp systems and OEM door systems are coordinated are disclosed in U.S. Pat. No. 6,825,628, the contents of which are hereby incorporated by reference. Existing access control systems include specialized controllers that are spliced into the OEM wiring systems of the vehicle, such as the data bus, to intercept or otherwise detect signals transmitted along the OEM wiring systems. These controllers are able to delay or suspend the transmission of certain of these signals such that, for example, closing of the power sliding door can be delayed or suspended until such time as an access ramp is fully stowed. Similarly, the systems are configured to detect commands sent to the door control module and/or the body control module for opening the power sliding door. Upon determining that the door is fully open, the systems begin deploying the ramp.

SUMMARY

One embodiment of the invention provides an access control system for a vehicle including an automatic door, a door control system, a door switch, a door motor, a ramp control system, and a ramp. The access control system includes a system control board, a current detector, and a door full open switch. The system control board communicates with the ramp control system and is connected to the door switch. In addition, the current detector communicates with the system control board and is configured to detect changes in current drawn by the door motor. The system control board also may communicate with a door full open switch that is operable to detect when the door is completely open. In response to receipt of a first door operation signal, the door control module operates the power door system to open or close the door. Operation of the door motor to open or close the door causes a current spike along the power wire or wires for the door motor. The current detector senses this current spike and sends a first signal to the system control board. Upon receiving the first signal, the system control board communicates with the ramp control system to determine whether the ramp is stowed or deployed. If the ramp is deployed, the system control board simulates a second door operation signal which is received by the door control module. In response to receiving the second door operation signal, the door control module operates to reverse movement of the door, thereby maintaining the door in a fully open position to prevent the door from closing on the deployed ramp. In many cases, reversal of the door movement occurs so rapidly that movement of the door is substantially imperceptible. After preventing closure of the door, the system control board communicates with the ramp control system to stow the ramp.

If the ramp is stowed when the current detector sends the first signal to the system control board, the system control board waits for the current detector to send a second signal that corresponds to the door reaching a fully open position. Upon receiving the second signal, the system control board communicates with the ramp control system to deploy the ramp.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
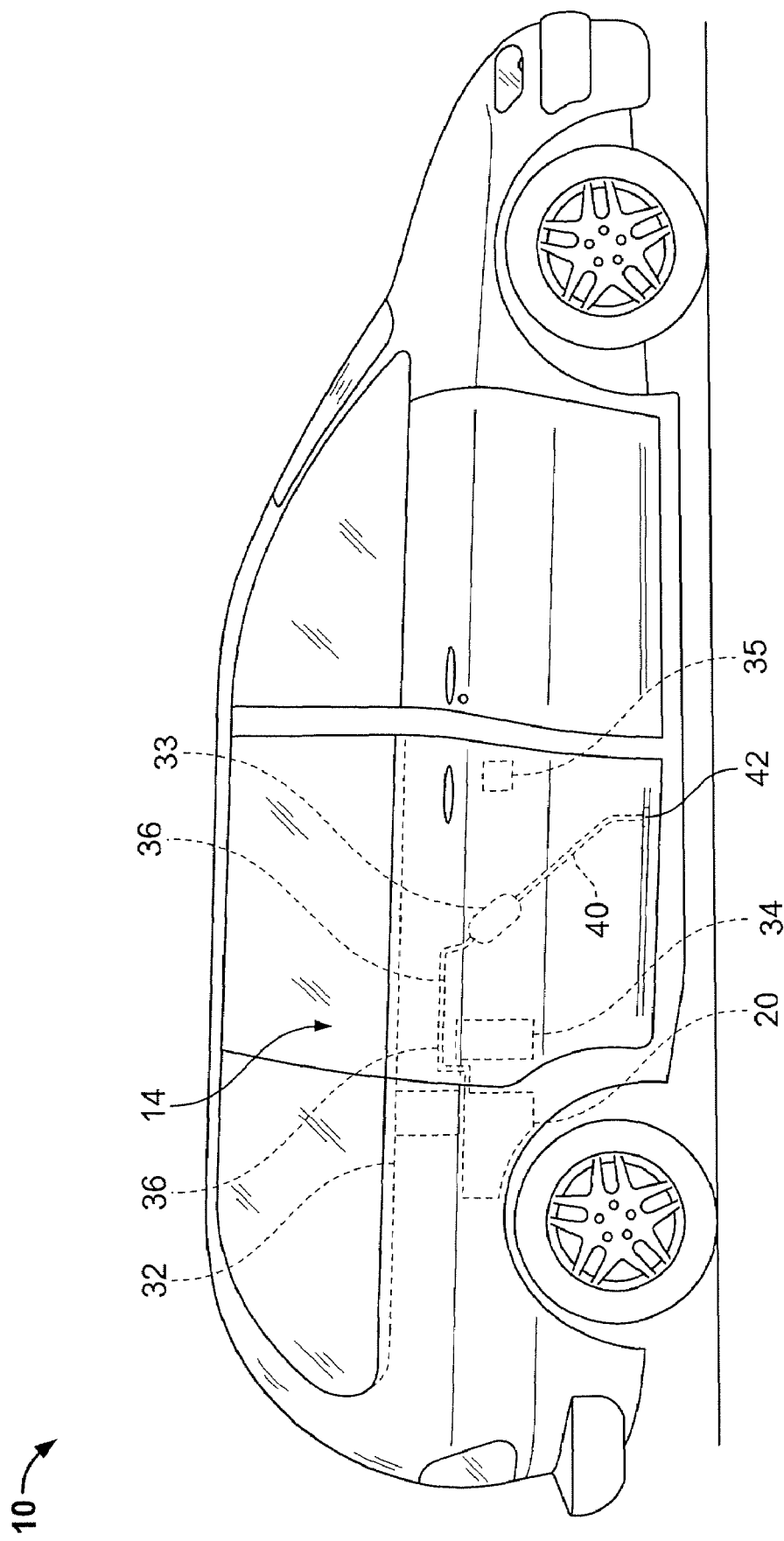
FIG. 1 is a side view of a minivan including an embodiment of an access control system of the present invention.
Figure 2:
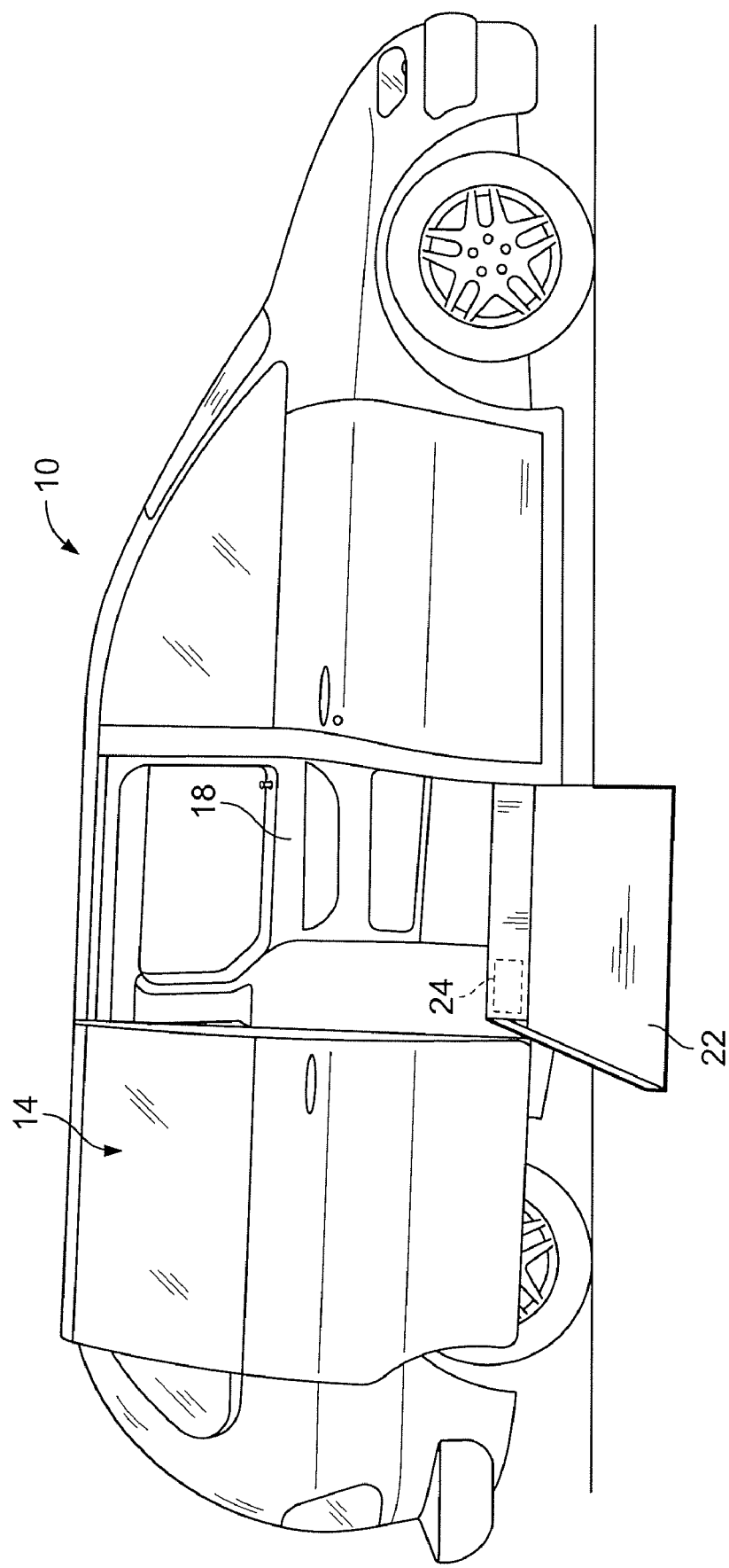
FIG. 2 is a side view of the minivan of FIG. 1 with a power sliding door in an open position and an access ramp deployed.

FIGS. 1 and 2 illustrate a vehicle 10 (e.g. a minivan) that has been configured for use with an access control system of the present invention. The vehicle 10 includes a passenger side sliding door 14, a driver side sliding door 18 (FIG. 2) and at least one power sliding door module (PSDM) 20, illustrated schematically in FIG. 1. The PSDM 20 is operable to automatically open and close the door 14. A second PSDM may be provided to open and close the door 18. In the illustrated vehicle 10, the PSDM 20 is provided by the factory as an OEM vehicle component; however, the present invention can also be employed where an aftermarket manufacturer installs a non-OEM door control mechanism for opening and closing the door 14.

The vehicle 10 also includes a ramp 22 that is generally not provided by the vehicle manufacturer but is installed by an aftermarket manufacturer to improve access to the interior of the vehicle for, among other reasons, use by mobility-impaired individuals. The ramp 22 is moveable between a deployed position (shown in FIG. 2) in which the ramp affords access to the vehicle interior, and a stowed position in which the ramp 22 is positioned within the vehicle. The ramp 22 includes a ramp control system 24 which can include, among other things, a ramp motor and a ramp drive system that are operable to move the ramp 22 between the stowed and deployed positions. The ramp 22 also includes ramp sensors that are operable to sense or detect whether the ramp is deployed or stowed, and may also detect whether the ramp encounters an obstruction while moving between the deployed and stowed positions. The vehicle 10 may also include a kneeling system (not shown) that is operable to lower the vehicle to reduce the angle of the ramp 22 when the ramp 22 is deployed. Examples of suitable ramp motors and drive systems, ramp sensors, and kneeling systems are provided in U.S. Pat. No. 6,825,628.

Figure 3:
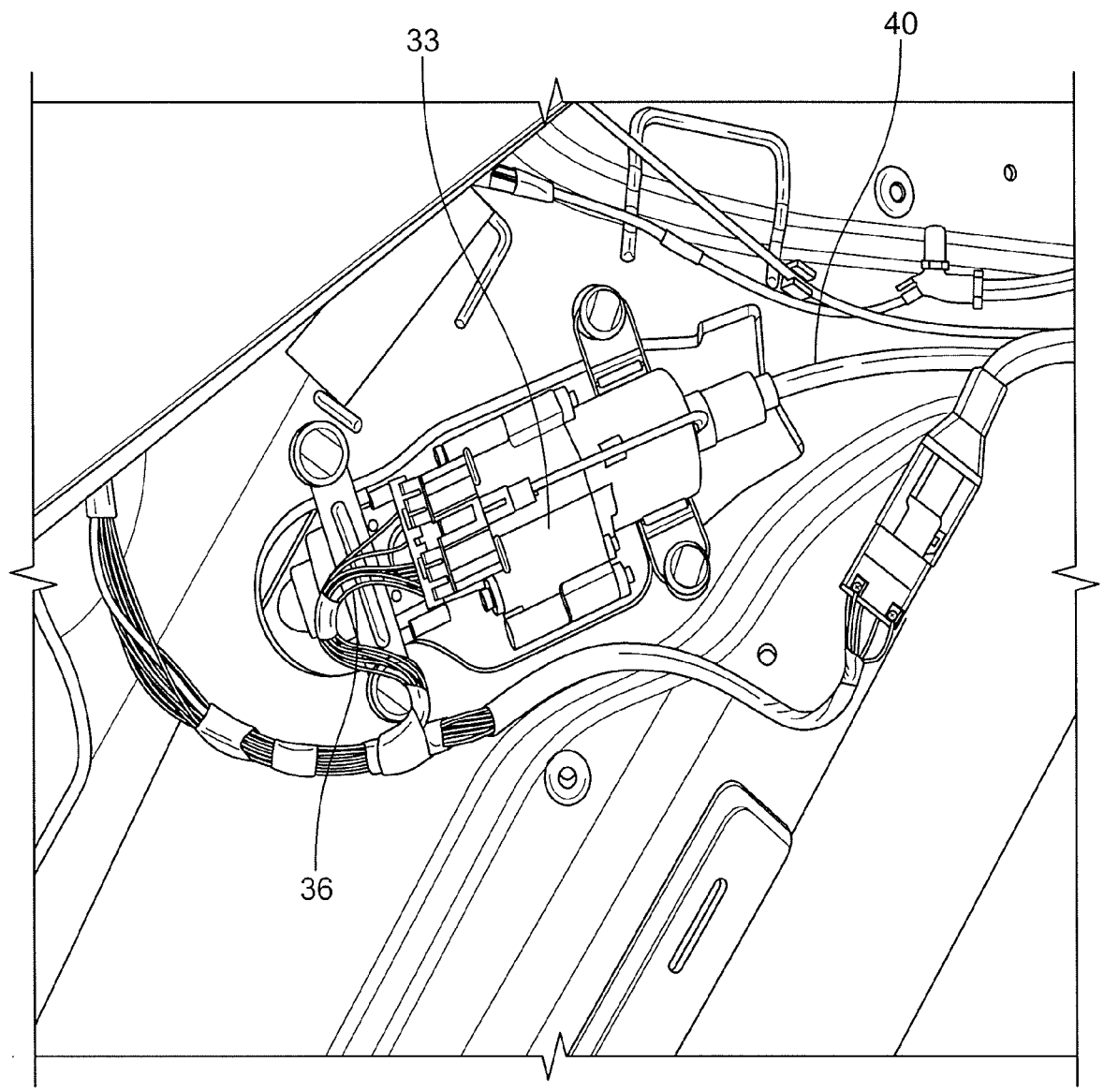
FIG. 3 is a plan view illustrating a door motor for the power sliding door of the minivan of FIG. 1.

With reference also to FIG. 3, one example of an OEM automatic door operation system includes a door motor 33 operable to open and close the door 14. In some OEM configurations, the door motor is coupled to a flexible drive cable 40 which in turn drives a pinion gear 42, the pinion gear engaging a corresponding gear rack (not shown) mounted on the vehicle to move the door 14. (See FIG. 1). Other OEM configurations include cable and pulley or chain and sprocket type drive systems. It should be appreciated that the specific configuration of the power sliding door drive system may vary significantly depending upon the vehicle manufacturer.

Regardless of the specific drive system used to move the door, the door motor 33 is typically an electric motor selected by the OEM. The door motor 33 is therefore coupled to OEM power wires 36 that carry electrical power to the door motor 33 from the vehicle's electrical system. In the illustrated embodiment, one end of each power wire 36 is connected to the door motor 33 and an opposite end is connected to the PSDM 20 (not shown). The PSDM 20 controls when the door motor 33 is energized to open or close the door 14. Although FIG. 1 illustrates the door motor 33 coupled to the passenger side sliding door 14, the door motor 33 may instead be coupled to another portion of the vehicle (e.g. near the PSDM 20) depending upon the configuration of the power sliding door drive system. Similarly, the PSDM 20 may be positioned in a variety of locations, including within the passenger side sliding door 14.

Figure 4:
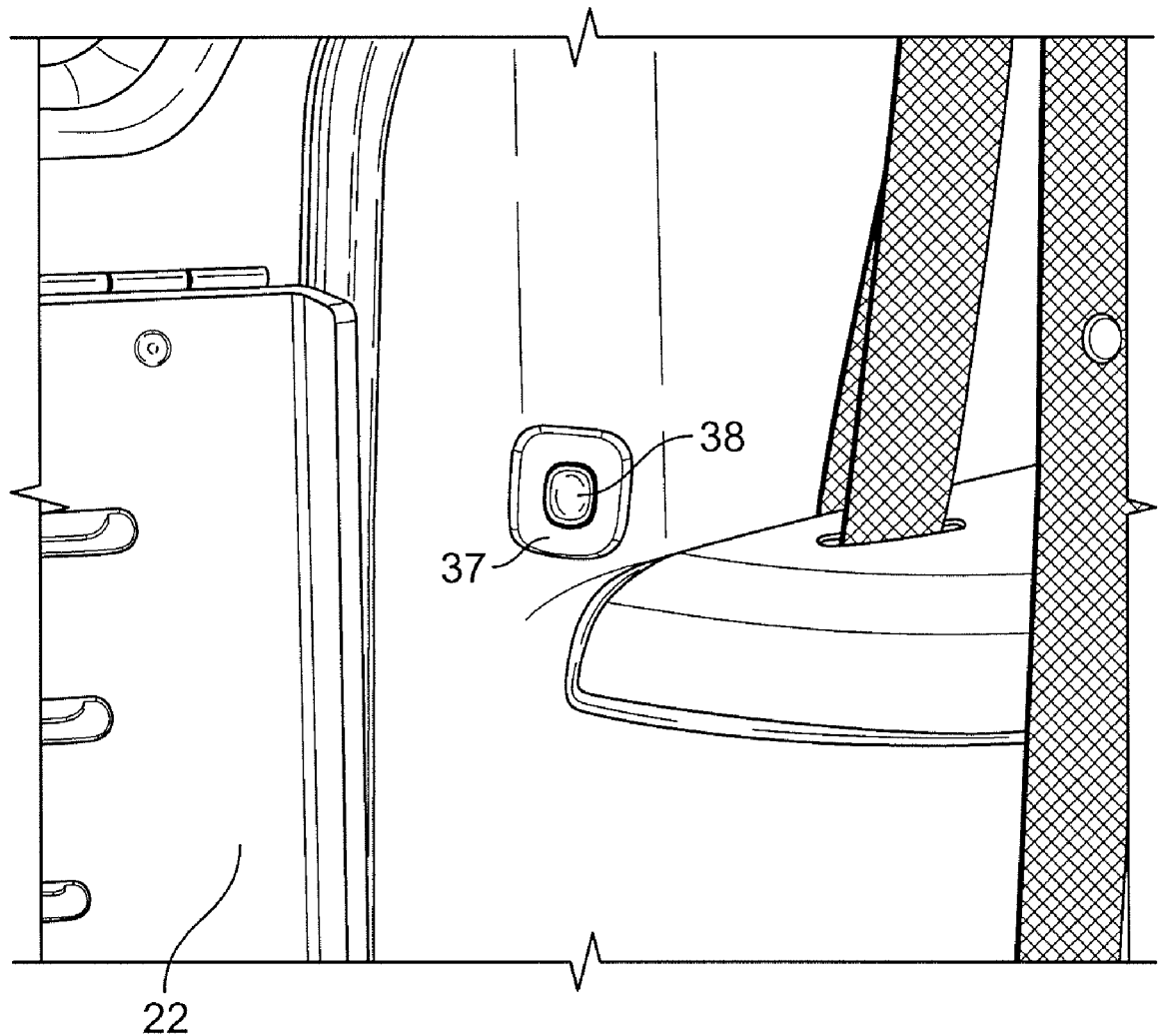
FIG. 4 is a perspective view of a door switch of the minivan of FIG. 1.

FIG. 4 illustrates an example of a door switch 37. The door switch 37 communicates with the PSDM 20 to control operation of the door motor 33. In the illustrated embodiment, the door switch 37 includes a button 38. The door switch 37 can be either a normally open or a normally closed switch. For the illustrated vehicle 10, the door switch 37 is a normally open switch, and is configured such that when a user presses the button 38 the switch will close an electrical circuit. When the button is released, the switch 37 returns to the open position.

If the door 14 is in a closed position, operation of the door switch 37 activates the door motor 33, thereby causing the door 14 to open. If the door 14 is open, operation of the door switch 37 activates the door motor 33 to close the door 14. If the door switch 37 is operated while the door 14 is in the process of opening or closing, the door 14 will reverse directions and return to either the open or closed position. Other OEM door control devices, such as a remote key fob and other door switches located throughout the vehicle 14, to the extent they are present, generally operate the door 14 in the same way as the door switch 37.

Returning to FIG. 1, the access control system includes a controller in the form of a system control board 32, a current detector 34, and, in the illustrated embodiment, a door full open switch 35. The system control board 32 is electrically coupled to the door switch 37 (FIG. 4) or the electrical circuit associated with the door switch, and is operable to close the door switch 37 or to simulate closing of the door switch on the electrical circuit (e.g. by grounding one of the door switch electrical wires). In addition, in the illustrated embodiment, the system control board 32 is coupled to the vehicle's power and ground sources. In other constructions, the system control board 32 can be powered by batteries so that, except for the connection to the door switch 37 or door switch circuitry, it is substantially isolated from the OEM wiring of the vehicle 10.

The system control board 32 is also in communication with the ramp control system 24. The system control board 32 and the ramp control system 24 may be in direct, wired communication with one another or may communicate wirelessly. The system control board 32 and the ramp control system 24 may be in the same or different housings, and may share or combine certain functions relating to the operation of the ramp 22. For example, the sensors for determining whether the ramp 22 is stowed or deployed may be in direct communication with the system control board 32, which may include programming logic to interpret the signals received from these sensors.

The system control board 32 is also coupled to the current detector 34. The current detector 34 is configured to detect one or more of the presence or absence of current, a current level, or a relative change in current level on at least one of the power wires 36 of the door motor 33. Operation of the door motor 33, including starting and stopping of the door motor, causes different current levels to pass through the power wires 36. The current detector 34 detects these different current levels and sends signals to the system control board 32, which is then able to determine if the door motor 22 is operating, starting to operate, or not operating. Examples of suitable electrical devices and circuitry that may be implemented as the current detector 34 include transistors, op-amps, or opto-isolators. In one embodiment, the current detector 34 is a Hall effect sensor switch, model no. CSDA1DA available from the Micro-Switch division of Honeywell International, Inc. In some applications, the Hall effect switch may be particularly beneficial because it does not require disconnecting, cutting and/or splicing of the power wires 36. Specifically, the Hall effect switch includes a sensor having an effective range that may vary depending upon the specific sensor, but which is generally less than an inch. By positioning the power wire within the effective range of the sensor, the sensor is able to detect changes in current flowing through the power wires 36. In some embodiments, the sensor defines an opening through which the power wires 36 are extended to ensure that the wires are within the effective range of the sensor. When current is applied to the power wires 36, the Hall effect switch senses the corresponding change in magnetic field in the vicinity of the sensor. Thus, no electrical connections with the power wires 36 are necessary.

Although the illustrated current detector 34 is shown mounted within the vehicle door 14, the current detector 34 may also be mounted on other areas of the vehicle, so long as the current detector 34 can monitor the current carried by the electrical wires 36 coupled to the door motor 22. For example, the current detector 34 may be mounted aft of the door 14, near the PSDM 20.

In the illustrated embodiment, the system control board 32 also communicates with a door full open switch 35 to determine when the door 14 reaches a fully open position. Although the illustrated door full open switch 35 is coupled to the door 14, the door full open switch 35 may also be coupled to the vehicle B-pillar or substantially any other location from which the door full open sensor 35 is able to sense when the door has reached a fully open position.

Figure 5:
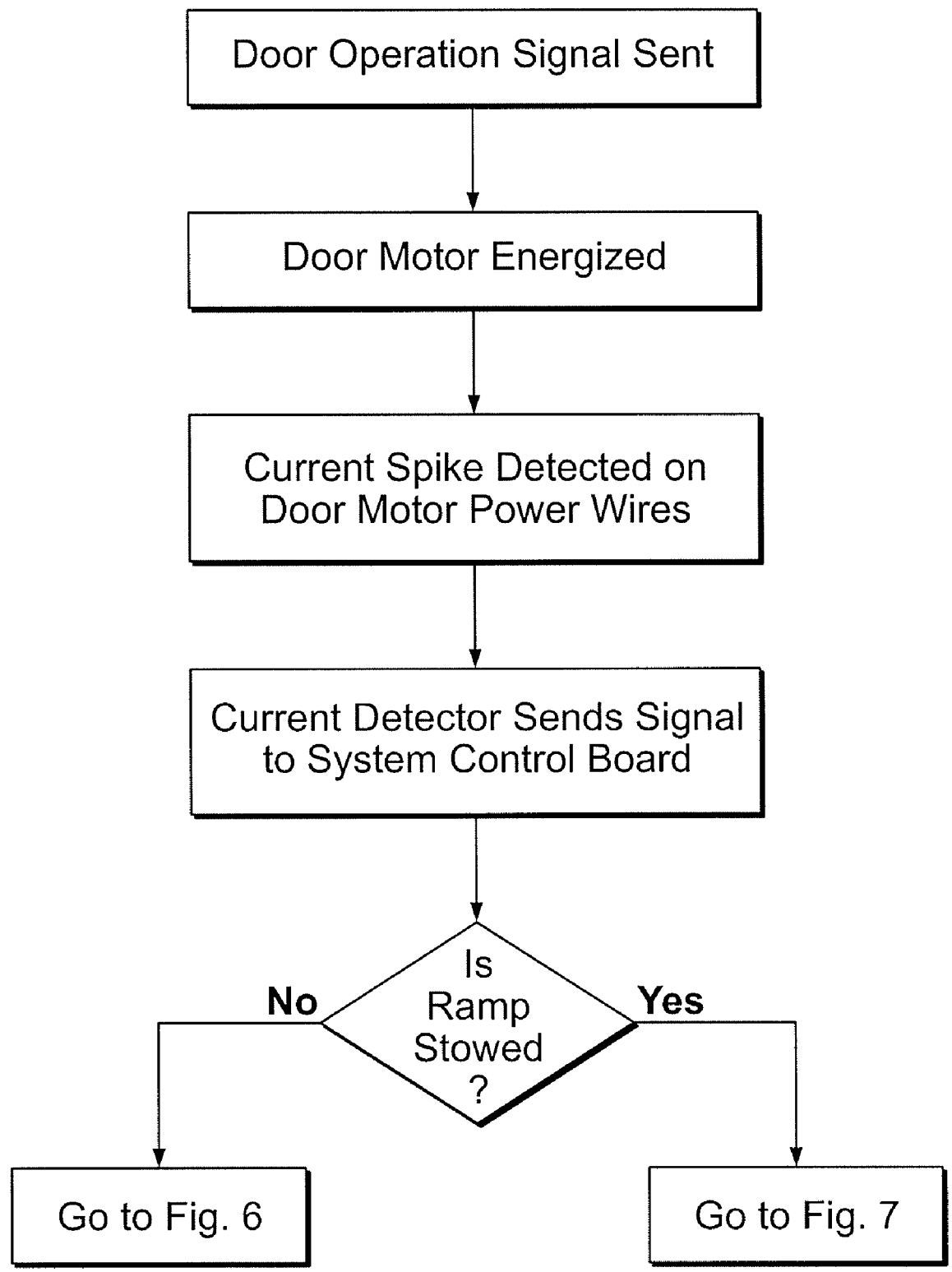
FIG. 5 is a flowchart illustrating operation of the access control system of FIG. 1.

With reference to FIG. 5, operation of the system is generally initiated by sending a door operation signal. The door operation signal may be sent by depressing an interior button or switch (e.g., the button 38), by pressing a button on a remote key fob, or by substantially any other method. In response to receiving the door operation signal, if the door is in the closed position the PSDM 20 energizes the door motor 33 to open the door 14. If the door is in the opened position, the PSDM 20 energizes the door motor 33 to close the door. Regardless of whether the door is being opened or closed, energizing the door motor 33 causes a current spike in the door motor power wires 36, which is detected by the current detector 34. Upon detecting the current spike, the current detector 34 sends a signal to the system control board 32, which interprets the signal and determines that the door motor 33 has just begun to operate. The system control board 32 then communicates with the ramp control system 24 to determine whether the ramp 22 is deployed or stowed. Alternatively, the system control board 32 may store the ramp status in internal memory.

Figure 6:
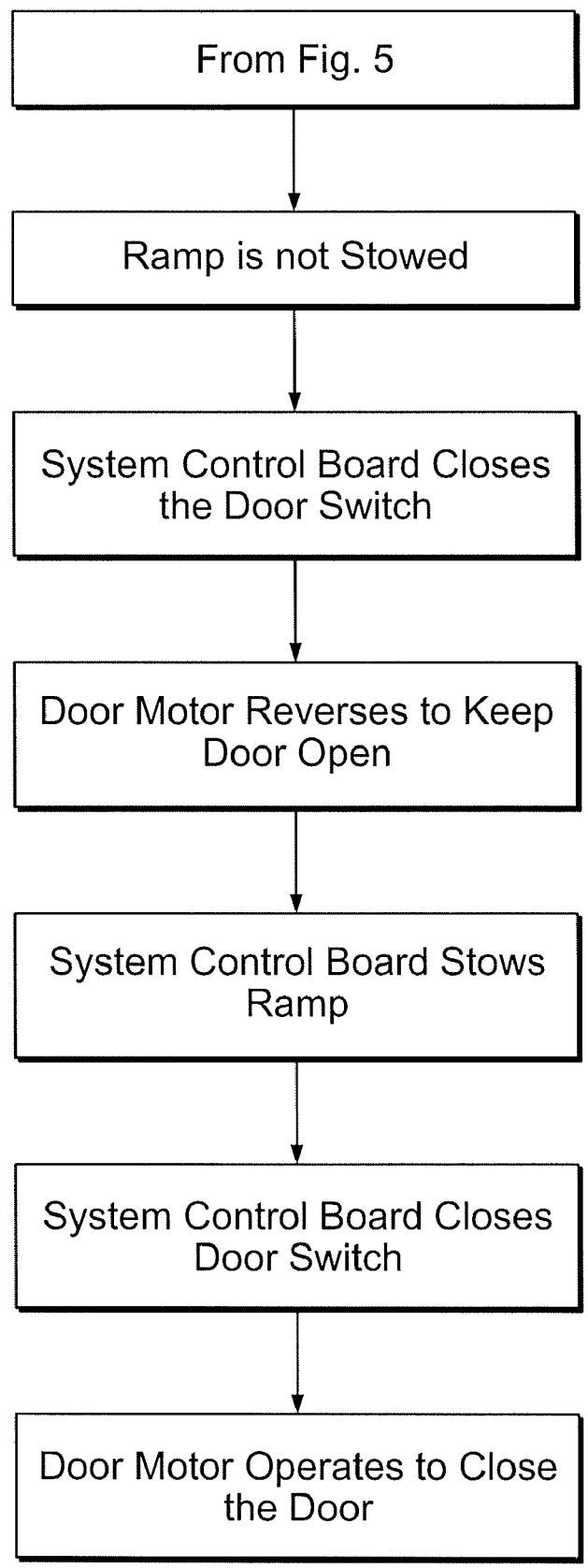
FIG. 6 is a flowchart illustrating a ramp-stowing operation of the access control system of FIG. 1.

FIG. 6 illustrates the operating sequence if the ramp is deployed when the system control board 32 receives the signal from the current detector 34 indicating that the door motor 33 has been activated. Upon determining that the ramp 22 is not stowed (i.e., is deployed), the system control board 32 assumes that the door 14 is open and that the user initiated the door operation signal in order to stow the ramp 22 and close the door 14. In this case, the system control board 32 operates the door switch 37 (e.g., grounds one of the door switch wires) to send a second door operation signal to the PSDM 20. This second door operation signal has the effect of reversing movement of the door 14 so that the door 14 remains open. In many instances this operation can be accomplished so rapidly that there is little or no perceptible movement of the door 14. Once the door 14 has been prevented from closing, the system control board 32 communicates with the ramp control system 24 to stow the ramp 22. When the ramp 22 is fully stowed, the system control board 32 once again operates the door switch 37 to send a third door operation signal to the PSDM 20. Because the door is open, The PSDM 20 responds by activating the door motor 33 to close the door 14.

Figure 7:
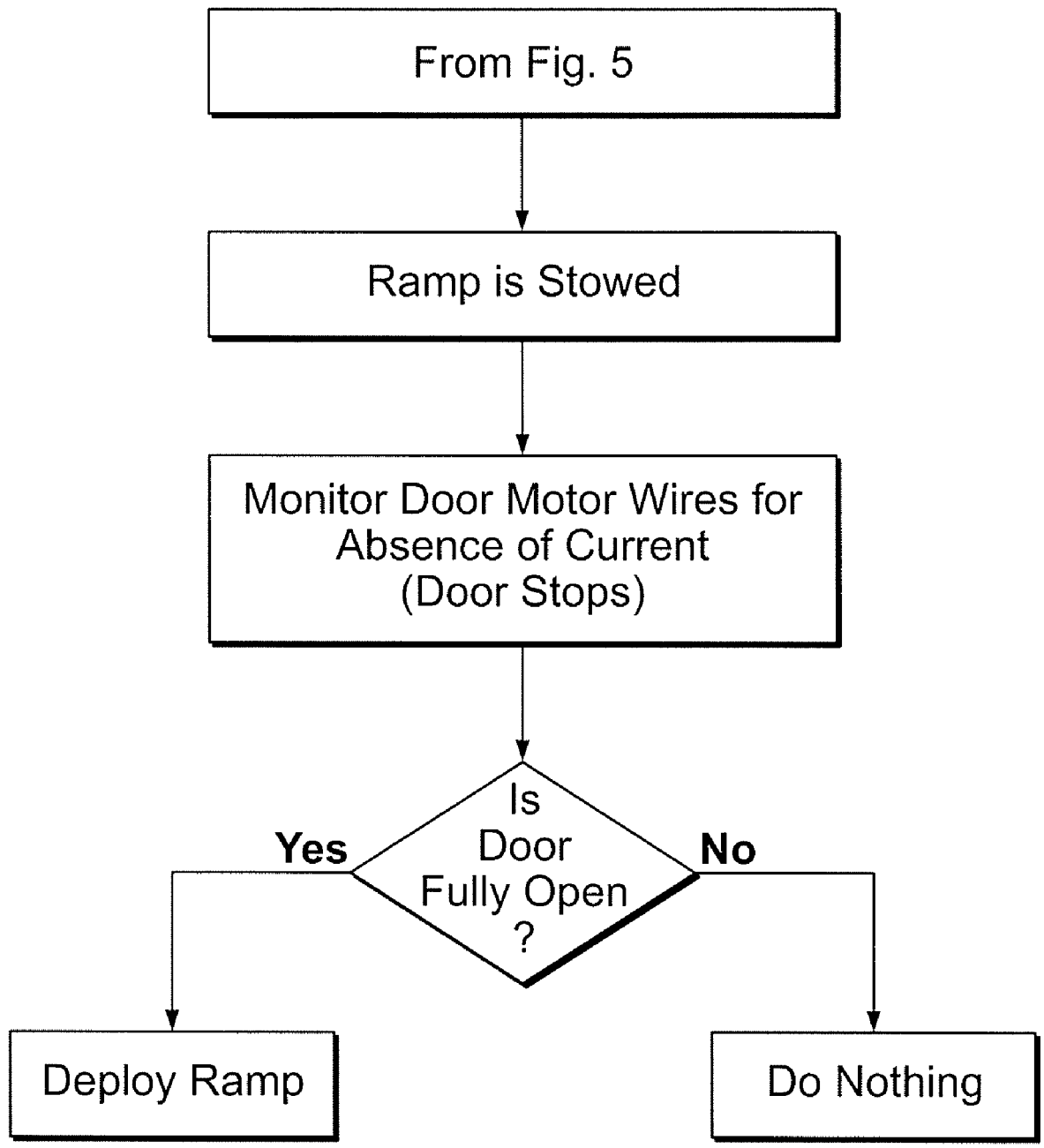
FIG. 7 is a flowchart illustrating a ramp-deploying operation of the access control system of FIG. 1.

FIG. 7 illustrates the operating sequence if the ramp is stowed when the system control board 32 receives the signal from the current detector 34 indicating that the door motor 33 has been activated. Upon determining that the ramp 22 is stowed, the system control board 32 assumes that the door 14 is closed and initiates a process for opening the door 14 and deploying the ramp 22. Rather than reversing the door 14, the control board 32 allows the door 14 to continue moving toward the open position and waits for a signal from the current detector 34 that the current on the power wire or wires 36 for the door motor 33 has returned to substantially zero (or to any other value that indicates that the door motor 33 is not operating).

Although this reduction in motor current (e.g. to zero) generally indicates that the door has stopped moving, it is possible that the door encountered an obstacle as it was opening and is not fully opened. Thus, to verify that the door 14 has reached a fully open position, the system control board 32 communicates with the door full open switch 35. If the door full open switch 35 indicates that the door 14 is not completely open, the system control board 32 takes no further action. However if the door full open switch 35 indicates that the door 14 is completely open, the system control board 32 communicates with the ramp control system 24 to deploy the ramp 22. In some embodiments, the door full open switch 35 may be eliminated by configuring the system control board 32 to measure the amount of time the door motor is energized and comparing it with a known time value equal to the time it normally takes for the door 14 to open completely.

A vehicle kneeling system can be incorporated with both of the systems illustrated in FIG. 1. In such case, the system control board 32 can be configured to communicate with the kneeling system for controlled operation thereof, such that the vehicle 10 kneels or stands generally while the door 14 is opening or closing and/or the ramp 22 is being deployed or stowed.

The invention claimed is:

1. A method for providing access to a vehicle, the vehicle including a door movable between an open position and a closed position, a door motor for moving the door, a ramp movable between a stowed position and a deployed position, and a ramp control system for moving the ramp, the method comprising:

sending a first door operation signal to move the door;
delivering electrical power to the door motor to initiate movement of the door in response to the first door operation signal;
detecting initiation of the delivery of electrical power to the door motor;
determining whether the ramp is in the stowed position or the deployed position and:
i) if the ramp is in the deployed position:
sending a second door operation signal to reverse movement of the door and thereby maintain the door in an open position;
operating the ramp control system to stow the ramp; and
sending a third door operation signal to close the door;
ii) if the ramp is in the stowed position:
waiting for the door to move to the open position; and
operating the ramp control system to deploy the ramp.

2. The method of claim 1, further comprising communicating to an access system controller detection of the initiation of the delivery of electrical power to the door motor.

3. The method of claim 1, wherein the step of determining whether the ramp is in the stowed position or the deployed position is in response to detecting the initiation of the delivery of electrical power to the door motor.

4. The method of claim 1, wherein detecting the initiation of the delivery of electrical power to the door motor includes detecting current in a door motor power wire by way of a hall-effect sensor switch.

5. The method of claim 1, wherein sending the first door operation signal includes initiating a first door operation request by way of one of a remote key fob and an interior vehicle switch.

6. The method of claim 5, wherein sending the second door operation signal includes initiating a second door operation request by way of an access system controller.

7. The method of claim 6, wherein initiating the second door operation request includes electrically simulating operation of an OEM door switch.

8. The method of claim 6, wherein if the ramp is in the deployed position the access system controller automatically sends the second door operation request after detection of the initiation of the delivery of electrical power to the door motor.

9. The method of claim 1, wherein waiting for the door to move to the open position includes monitoring for a reduction in electrical power delivered to the door motor.

10. The method of claim 1, further comprising sensing whether the door has moved to a fully open position before operating the ramp control system to deploy the ramp.

11. A method for an access system in a vehicle, the vehicle including a power door movable between an open position and a closed position, and a door motor operable to move the power door between the open and closed positions in response to electrical power carried by a door power wire, the method comprising:
    installing a ramp in the vehicle, the ramp movable between a stowed position and a deployed position and providing access to the vehicle when the ramp is in the deployed position and the door is in the open position;
    coupling a ramp control system to the ramp, the ramp control system operable to move the ramp between the stowed position and the deployed position;
    operably associating a current detector with the door power wire, the current detector operable to detect initiation of electrical current flowing through the door power wire;
    installing an access system controller in the vehicle;
    coupling the access system controller with the ramp control system for communication therewith; and
    coupling the access system controller to the current detector for communication therewith.

12. The method of claim 11, wherein the current detector includes at least one of a transistor, operational amplifier, or optical isolator, and wherein operably engaging the current detector with the door power wire includes electrically coupling the current detector with the door power wire.

13. The method of claim 11, wherein the current detector includes a hall effect sensor switch including a sensor having an effective range, and wherein operably engaging the current detector with the door power wire includes positioning the power wire within the effective range of the sensor.

14. The method of claim 11, wherein the vehicle includes a switch for requesting operation of the door motor, the method further comprising coupling the access system controller to the switch for requesting operation of the door motor.

15. The method of claim 14, further comprising configuring the access system controller to automatically request operation of the door motor by way of the switch in response to the current detector detecting the initiation of electrical current flowing through the door power wire when the door is open and the ramp is deployed.

16. The method of claim 15, further comprising configuring the access system controller to cause the ramp to move to the stowed position after automatically requesting operation of the door motor by way of the switch.

17. The method of claim 11, further comprising installing a door full open sensor in the vehicle to sense whether the door is in a fully open position and coupling the access control system to the door full open sensor.

18. The method of claim 17, further comprising configuring the access system controller to wait for a signal from the door open sensor indicating that the door is fully open and to then to cause the ramp to move to the deployed position in response to the current detector detecting initiation of electrical current flowing through the door power wire when the door is closed and the ramp is stowed.

19. An access system for a vehicle, the access system comprising:
    a power door movable between an open position and a closed position;
    a door motor for moving the door between the open and closed positions;
    a door power wire for supplying electrical power to the door motor;
    a current sensor for detecting initiation of current flowing through the door power wire;
    a ramp movable between a stowed position and a deployed position; and
    a controller for coordinating operation of the ramp and the door in response to signals received from the current sensor.

20. The access system of claim 19, further comprising a switch for requesting operation of the door motor to move the door between the open and closed positions.

21. The access system of claim 20, wherein the controller is operable to request operation of the door motor to move the door by electrically simulating operation of the switch.

22. The access system of claim 21, wherein in response to receiving a signal from the current sensor that current has initiated flowing through the door power wire, the controller determines whether the ramp is stowed or deployed.

23. The access system of claim 22, wherein if the controller determines that the ramp is deployed, the controller electrically simulates operation of the switch, thereby causing the door motor to reverse direction.

24. The access system of claim 22, wherein if the controller determines that the ramp is stowed, the controller waits for a signal indicating that the door is fully open and then deploys the ramp.

* * * * *